Sept. 23, 1958     H. D. STURDY     2,853,164
SPEED CONTROL FOR AUTOMOTIVE VEHICLES
Filed Dec. 8, 1955
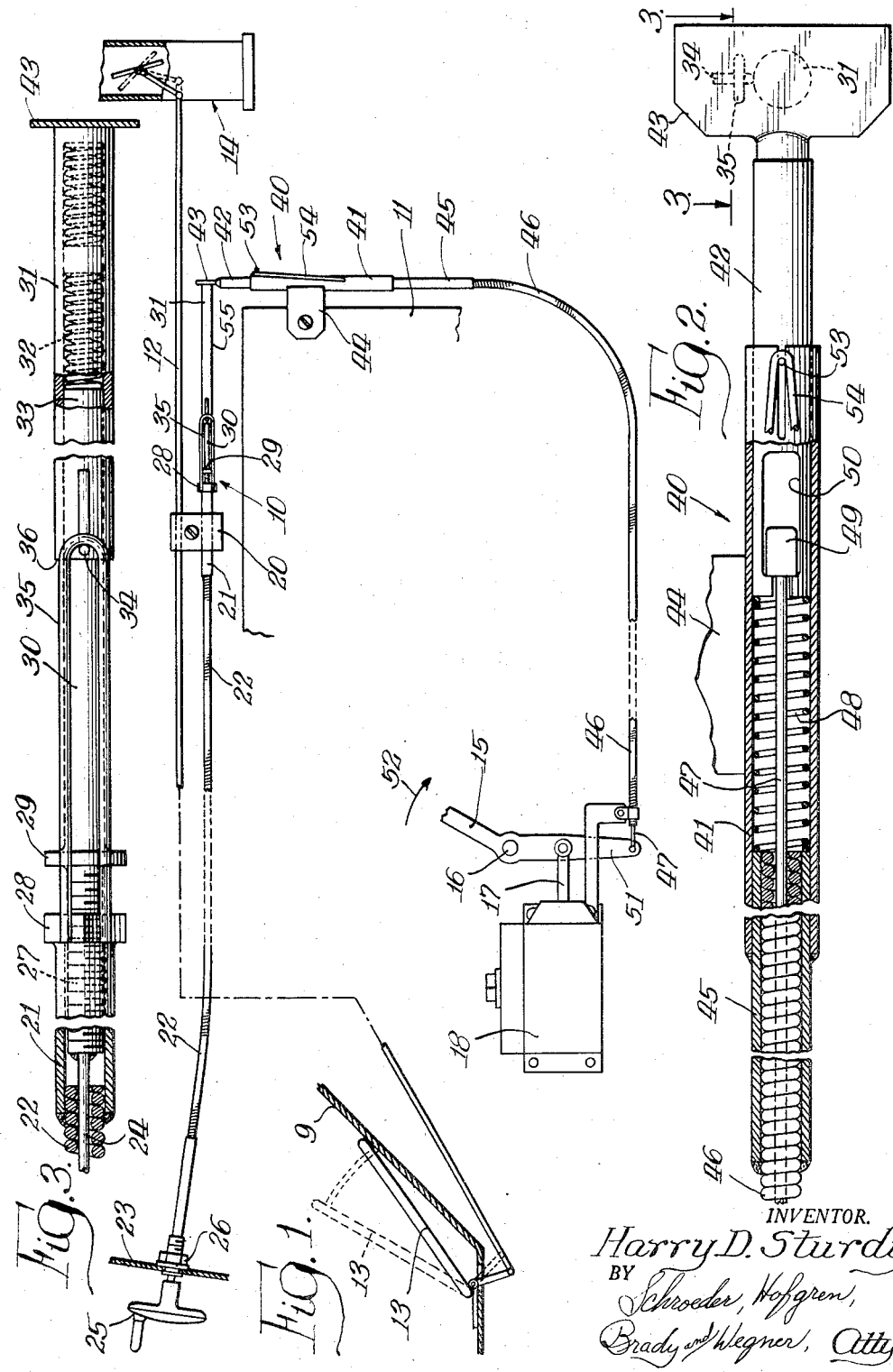
INVENTOR.
Harry D. Sturdy,
BY Schroeder, Hofgren,
Brady and Wegner, Atty's.

United States Patent Office 2,853,164
Patented Sept. 23, 1958

2,853,164

SPEED CONTROL FOR AUTOMOTIVE VEHICLES

Harry D. Sturdy, Chicago, Ill.

Application December 8, 1955, Serial No. 551,792

4 Claims. (Cl. 192—3)

This invention relates to a speed control for an automotive vehicle.

The primary object of this invention is to provide a manually operable speed controller for an automotive vehicle which may be rendered operative and inoperative with the use of a vehicle accelerator pedal and brake pedal respectively.

Another object is to provide a speed control for an automotive vehicle which can be manually set to maintain desired vehicle speed and automatically released in response to application of the vehicle brake.

Another object is to provide a speed control of the character described which permits selection of vehicle speed throughout the complete speed range of a particular vehicle and which may be released upon application of the vehicle brake.

Other objects, features and advantages of the invention will be apparent from the following description of an embodiment illustrated in the drawings in which:

Figure 1 is a broken diagrammatic plan view of the invention as installed with relative components of an automotive vehicle.

Figure 2 is a fragmentary sectional view through one member of the vehicle controller; and Figure 3 is a fragmentary sectional view through another member of the controller taken substantially along line 3—3 in Figure 2.

While this invention is susceptible of embodiments in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

An automotive vehicle such as a passenger automobile has a foot operated accelerator connected by a linkage system to the carburetor of the vehicle engine. This linkage system is spring biased to a position which will maintain the engine at an idling speed. The present speed controller is mountable for use in conjunction with the usual accelerator and linkage referred to. Parts of the controller are mounted within the engine compartment of the vehicle and a manually operable selector is placed within the passenger compartment for operation by the vehicle driver.

Referring to Figure 1, a throttle controller generally indicated 10 is shown as in an engine compartment adjacent the engine block 11 for use with a rod 12 in the linkage between an accelerator pedal 13 in the passenger compartment and a carburetor diagrammatically shown at 14. Other parts of the usual motor vehicle include a brake pedal 15 having a fulcrum 16 for operating the plunger 17 of the master brake cylinder 18 controlling flow of hydraulic fluid to the individual wheel brakes of the vehicle. The controller of this invention operates in conjunction with these usual components of the vehicle.

The speed controller 10 may be connected by means of a bracket 20 to a rod 12 of the usual throttle controlled vehicle. The controller 10 is shown in detail in Figure 3. A contact carrier or housing 21 is attached to a flexible cable carrier 22 which extends as illustrated in Figure 1 into the passenger compartment through a fire wall. An inner cable 24 carried within the outer sheath 22 may be connected to a hand crank 25 on the interior of the passenger compartment and placed in a position to be easily reached by the driver. As illustrated in Figure 1, a coupling 26 may be provided for the purpose of attaching the cable 22 to the dashboard 23 of the vehicle.

The hand crank 25 is provided for the purpose of manually selecting the speed at which the driver wishes the vehicle to move. In order to accomplish this purpose, the inner cable 24 may be turned by the hand crank to threadably move a threaded member 27 through a nut 28 secured to the free end of the contact carrier 21. Threading of this member through the nut moves an abutment 29 secured thereto in a direction longitudinal of the control unit. A rod 30 extends outwardly beyond the abutment 29 for telescopingly supporting a contact member 31 thereon. A compression spring 32 is mounted so as to bear against the end 33 of the rod 30 and the interior of the hollow sleeve contact member 31. The contact has a lost motion connection with the rod 30 and has been illustrated herein as involving a pin 34 on the contact movable within the confines of a simple loop 35 secured to the nut 28 on the contact carrier.

The vehicle engine speed may be controlled by the relative position of the abutment 29 and the contact carrier. It will be noted in Figure 1 that the contact carrier is secured to the throttle control rod 12 by the bracket 20 so that the carrier and rod move together as an unit. The contact 31 may telescope onto the rod until its inner end 36 abuts the abutment 29. The threaded member 27 is generally of a sufficient length to provide about two inches of adjustment which will take care of the range of movement provided in the accelerator linkages of most automobiles.

A speed control of the automotive vehicle is accomplished with the controller described by providing a stop against which the contact 31 of the controller may abut. This stop 40 is shown herein as mounted in a fixed position relative to the engine block 11 but is movable into and out of the path of the controller 10. The structure of the stop is best illustrated in Figure 2. A housing 41 telescopingly receives a barrel 42 supporting the stop blade 43. The housing 41 is attached to the engine block 11 by a bracket 44 either to a head bolt of the engine or any other convenient fixed support in the engine compartment. A sleeve 45 is secured in the rearward end of the housing for mounting and attaching a flexible cable 46 through which extends a control rod 47 for the contact plate. A compression spring 48 abutting the barrel 42 and sleeve tends to keep the control plate in an outward extended position. The control rod 47 within the cable has an enlargement 49 at one end which may be conveniently attached in a grooved slot 50 within the barrel.

The stop member 40 is so constructed that it may be operated to remove the stop plate from the path of the contact on the controller whenever the driver applies the brakes of the vehicle. Thus, the cable 46 carries the control rod 47 to a bracket 51 connected to the brake pedal 15. Upon application of the brake, moving the brake pedal in the direction of the arrow 52, the control cable 47 acts in opposition to the compression spring 48 to pull the stop into the housing out of the path of the contact 31. Ordinarily, adjustments may be made so that a one-quarter inch movement of the brake pedal will be sufficient to move the stop from the path of the contact.

The parts of the controller as illustrated in Figure 1 are in the position they would occupy should the accelerator of the vehicle be depressed to the floor. This action renders the controller effective. Referring to Figure 1, the accelerator 13 is depressed against the floorboard 9 of the automobile moving the throttle control rod 12 to full throttle position. The contact carrier is carried along with the control rod 12 pulling the contact 31 to the left in Figure 1 to a position as far as it will go. In this position, the contact will clear the stop plate 43 allowing it to slip out into the path of the contact. The distance the stop plate moves outwardly is limited by the lost motion connection of the pin 53 in the loop 54 on the side of the housing.

The next step in using the speed controller is for the driver to remove his foot from the accelerator so that it may return to the dotted line position shown in Figure 1. The usual spring bias on the linkage of the accelerator system tries to return this linkage to an idle position of the carburetor. The return of the linkage, however, is limited by the abutment of the end 36 of the contact against the abutment 29. Should the particular setting shown in the drawings be for maintaining the engine at a throttle setting which would produce a 15 mile per hour speed of the vehicle, the vehicle would maintain this speed steadily until the controller was disengaged. It will be thus apparent that the speed of the vehicle may be controlled from the engine compartment by turning the hand crank 25 to move the abutment 29 relative to the contact carrier.

Assuming that the controller is effective and the vehicle is moving at a predetermined selected speed, a very important safety feature of the present controller provides for an automatic release of the controller and return of the throttle setting to engine idle speed. Should the driver touch his brake pedal, the control rod 47 in the stop member pulls the stop plate away from the end of the contact 31 allowing it to slip past the stop plate. Thus, the compression spring 32 within the contact member would operate to move the contact past the stop. Thereafter the stop plate would ride upon the side 55 of the contact until the driver again depressed the accelerator pedal to the floor to carry the controller a sufficient distance to allow the stop to snap out into the path of the controller.

While the controller member and stop member described above are purely mechanical in nature, it is contemplated that the stop member could be operated by an electrical solenoid means; however, the mechanical structure is preferred. Very little maintenance is required of the parts once installed. The positioning of the controller and stop member may be made quite easily. The stop member may be attached in the engine compartment in a fixed position and thereafter the controller placed relative to the stop so that it will maintain engine idling speed if the abutment 29 is against the nut 28. The bracket 20 for attaching the controller to the usual throttle control rods may be easily tightened when the adjustment is made.

It is also contemplated that the parts could be reversed. The controller 10 may be placed in a fixed position and the stop 43 carried by the control rod 12. It is then only necessary to connect the cable running to the brake pedal to the controller so as to move it out of the path of the stop. Such reversal is fully contemplated within the present invention.

It has been found that the present speed controller may be used equally well for city or country driving. In restricted speed zones, the controller may be rendered effective to carry the automobile through the zone at a uniform speed. Should any emergency or danger require that the vehicle be slowed, a mere touch of the brake pedal will render the controller ineffective. Thereafter the controller will remain ineffective until the driver of the car desires to place it into operation by momentarily forcing the accelerator pedal to the floor rendering the controller effective as specified. Various modifications in the structure may be made and are contemplated in order that the controller be adaptable to all models and makes of automotive vehicles.

I claim:

1. An adjustable throttle control for an automotive vehicle having a throttle control rod and brake pedal comprising: a contact member carrier attached to the throttle control rod for longitudinal movement therewith during selective changes of throttle setting, a contact member carried by the carrier and having a lost motion connection therewith, an adjustable limit abutment on the carrier for limiting movement of the contact member toward the carrier, a stop limiting movement of the contact member away from the carrier, said contact member holding the throttle rod at a selected setting above engine idle speed when confined between said abutment and stop, and means for removing the stop from the path of the contact member upon movement of the brake pedal of the vehicle to render the control ineffective including a cable connecting the stop and brake pedal.

2. A throttle control as specified in claim 1 wherein the stop is yieldingly urged outwardly against the contact member and the contact member is yieldingly urged toward the stop preventing effective operation of the control until the vehicle throttle is moved to full open position to retract the contact member past the stop permitting the stop to return to a position in the path of the contact member.

3. A throttle control as specified in claim 1 in which the adjustable limit abutment is threadably secured to the carrier and is provided with flexible cable means for remote control from the vehicle interior.

4. An adjustable throttle control for an automotive vehicle having a throttle control rod and a brake pedal, comprising: a contact member carrier attached to the throttle control rod for lonigtudinal movement therewith during selective changes of throttle setting, a contact member carried by the carrier and having a lost motion connection therewith, a pair of stops in the path of said contact member for holding the throttle control rod in a predetermined position when the contact member is in engagement with both stops, means yieldingly maintaining the contact member out of confinement between said stops until the vehicle throttle control rod is moved to full open position, one of said stops being adjustably movable relative to the throttle control rod for selection of said predetermined position, said stops and contact member when engaged permitting further movement of the throttle control rod toward full open position at will and means operable to disengage one of the stops from the contact member upon brake pedal movement allowing the throttle control rod to return to normal engine idling position.

References Cited in the file of this patent

UNITED STATES PATENTS

| | | |
|---|---|---|
| 2,034,253 | Shelley | Mar. 17, 1936 |
| 2,076,460 | Heinrich | Apr. 6, 1937 |
| 2,313,000 | Hauguel | Mar. 2, 1943 |